US011917112B2

(12) United States Patent
Lee et al.

(10) Patent No.: US 11,917,112 B2
(45) Date of Patent: Feb. 27, 2024

(54) IMAGE FORMING APPARATUS CAPABLE OF EXPANDING SPACE BETWEEN IMAGE FORMING PART AND SCANNER PART

(71) Applicant: Hewlett-Packard Development Company, L.P., Spring, TX (US)

(72) Inventors: Byungjun Lee, Seongnam Si (KR); Seungsup Lee, Suwon (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/795,659

(22) PCT Filed: Jul. 13, 2020

(86) PCT No.: PCT/US2020/041799
§ 371 (c)(1),
(2) Date: Jul. 27, 2022

(87) PCT Pub. No.: WO2021/154329
PCT Pub. Date: Aug. 5, 2021

(65) Prior Publication Data
US 2023/0086885 A1 Mar. 23, 2023

(30) Foreign Application Priority Data

Jan. 30, 2020 (KR) .................. 10-2020-0011085

(51) Int. Cl.
*H04N 1/00* (2006.01)
*G03G 21/16* (2006.01)
(52) U.S. Cl.
CPC ..... *H04N 1/00559* (2013.01); *G03G 21/1604* (2013.01); *H04N 1/00535* (2013.01); *H04N 1/00543* (2013.01)
(58) Field of Classification Search
None
See application file for complete search history.

(56) References Cited

U.S. PATENT DOCUMENTS 7,822,358 B2 * 10/2010 Imada .................. G03G 15/605
347/242
2005/0275149 A1 * 12/2005 Kim ....................... B65H 29/50
347/139

FOREIGN PATENT DOCUMENTS

| JP | 2001203840 | | 1/2000 |
| JP | 2001160883 | A * | 6/2001 |
| JP | 2003110250 | | 9/2001 |
| JP | 2001326770 | A * | 11/2001 |

(Continued)

OTHER PUBLICATIONS

JP-2001326770-A English Translation, Fig 1, 2, par 0006, 0010-0011 (Year: 2001).*
JP-2009192792-A English Translation, Fig 2, par 0004, 0006, 0011 (Year: 2009).*
JP-2001160883-A English Translation, Fig 2, 4, par 0021-0023, 0025, 0039, 0048 (Year: 2001).*
JP-2006135736-A English Translation, Fig 1a, 1b, par 0017-0018, 0024 (Year: 2006).*
JP-2004198563-A English Translation, Fig 4a, 4b, par 0033 (Year: 2004).*

*Primary Examiner* — Miya J Cato
(74) *Attorney, Agent, or Firm* — Brooks, Cameron & Huebsch, PLLC

(57) ABSTRACT

An image forming apparatus includes an image forming part, a scanner part to moving up and down with respect to the image forming part, and a pair of side walls located between the image forming part and the scanner part while facing each other, the pair of side walls including a fixed side wall supported by the image forming part and a lifting side wall to moving up and down with respect to the fixed side wall and supported by the scanner part.

12 Claims, 17 Drawing Sheets

(56) References Cited

FOREIGN PATENT DOCUMENTS

| JP | 2004198563 A | * | 7/2004 |
|----|--------------|---|--------|
| JP | 2007279403 | | 4/2006 |
| JP | 2006135736 A | * | 5/2006 |
| JP | 2009192972 | | 2/2008 |
| JP | 2010107853 | | 10/2008 |
| JP | 2009192792 A | * | 8/2009 |
| JP | 2009192972 A | | 8/2009 |

* cited by examiner

IMAGE FORMING APPARATUS CAPABLE OF EXPANDING SPACE BETWEEN IMAGE FORMING PART AND SCANNER PART

BACKGROUND

An image forming apparatus may include an image forming part to print images on a printing medium, and a scanner part to read image information from a document. The scanner part is located above the image forming part. A printing medium on which an image is printed is discharged to a discharging tray provided on an upper surface of the image forming part. A user may access the discharged printing medium through a space between the scanner part and the image forming part.

BRIEF DESCRIPTION OF DRAWINGS

FIGS. 1 and 2 are perspective views of an image forming apparatus according to an example, wherein FIG. 1 shows a state in which a scanner part is positioned in a bottom dead position and FIG. 2 shows a state in which the scanner part is positioned in a top dead position.

FIGS. 10 and 11 are perspective views of an image forming apparatus according to an example, wherein FIG. 10 shows a state in which a scanner part is positioned in a bottom dead position and FIG. 11 shows a state in which the scanner part is positioned in a top dead position.

FIGS. 12 and 13 are schematic diagrams of a lifting mechanism according to an example, wherein FIG. 12 shows a state in which a scanner part is positioned in a bottom dead position and FIG. 13 shows a state in which a scanner part is positioned in a top dead position.

FIGS. 14 and 15 are schematic diagrams of a lifting mechanism according to an example, wherein FIG. 14 shows a state in which a scanner part is positioned in a bottom dead position and FIG. 15 shows a state in which a scanner part is positioned in a top dead position.

FIGS. 16 and 17 are schematic diagrams of a lifting mechanism according to an example, wherein FIG. 16 shows a state in which a scanner part is positioned in a bottom dead position and FIG. 17 shows a state in which a scanner part is positioned in a top dead position.

DETAILED DESCRIPTION OF EXAMPLES

Figure 1:
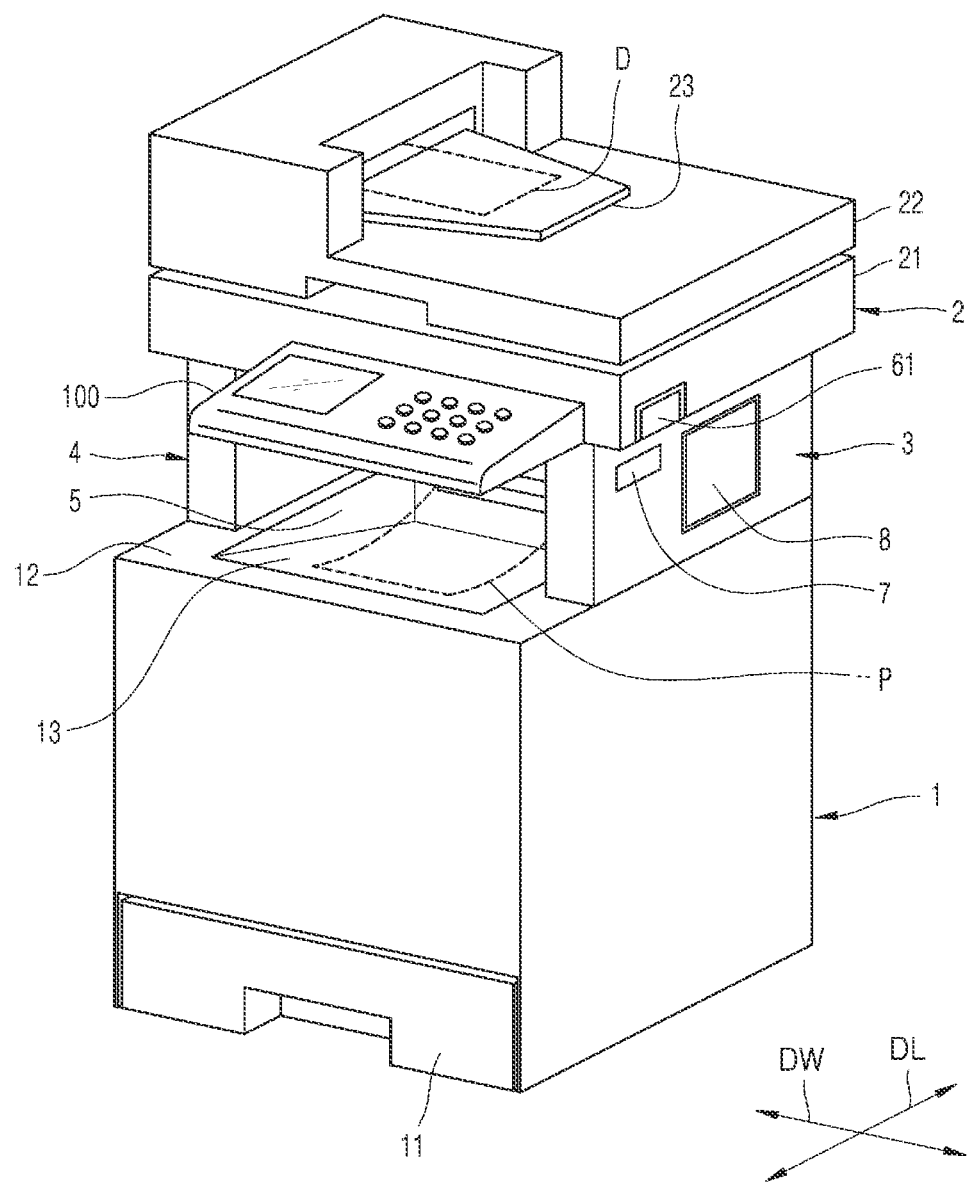

Hereinafter, examples of an image forming apparatus will be described below with reference to accompanying drawings. In the drawings, like reference numerals denote like components, and sizes or thicknesses of components in the drawings may be exaggerated for convenience of explanation.

Figure 2:
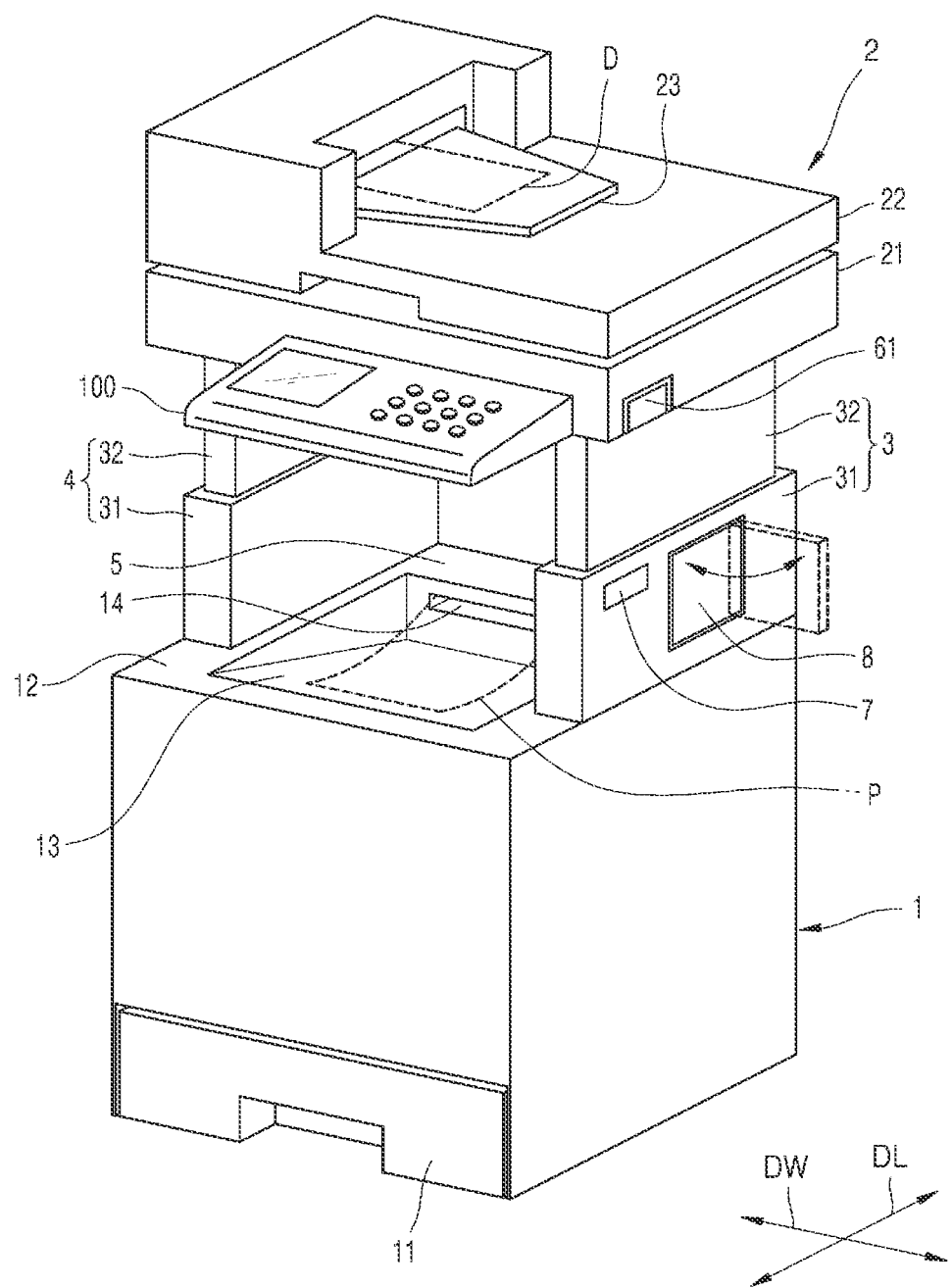

FIGS. 1 and 2 are perspective views of an image forming apparatus according to an example. FIG. 1 shows a state in which a scanner part 2 is positioned in a bottom dead position, and FIG. 2 shows a state in which the scanner part 2 is positioned in a top dead position.

Referring to FIGS. 1 and 2, the image forming apparatus according to the example includes an image forming part 1, the scanner part 2, a pair of side walls 3 and 4, and a locking mechanism. The image forming part 1 can print images on a printing medium P. A discharging tray 13 on which the printing medium P is loaded is provided on an upper surface 12 of the image forming part 1. The printing medium P can have a printing finished thereon. The scanner part 2 can read an image from a document. In some examples, the scanner part 2 is located above the image forming part 1 and forms a space 5 therebetween. The scanner part 2 may move up and down with respect to the image forming part 1. The image forming apparatus may include a lifting mechanism that supports the scanner part 2 to move up and down with respect to the image forming part 1. The lifting mechanism may be accommodated in the pair of side walls 3 and 4. The pair of side walls 3 and 4 may each include a fixed side wall 31 supported by the image forming part 1 and a lifting side wall 32 capable of moving up and down with respect to the fixed side wall 31 and supported by the scanner part 2. The pair of side walls 3 and 4 can be located between the image forming part 1 and the scanner part 2 to face each other. The locking mechanism can be provided in one wall of the pair of side walls 3 and 4 and can lock the scanner part 2 in a bottom dead position (see FIG. 1) and a top dead position (see FIG. 2). In some examples, the locking mechanism can be provided in both walls of the pair of side walls 3 and 4.

The image forming part 1 may print an image on a printing medium P supplied from, for example, a paper feeding cassette 11. The image forming part 1 may print a mono-color image or a full-color image on the printing medium P by various printing methods, such as an electrophotographic method, an inkjet printing method, a heat transfer method, a thermal sublimation method, etc. For example, the image forming apparatus, according to some examples, prints the image on the printing medium P by the electrophotographic method. In some instances, the image forming part 1 forms an electrostatic latent image by radiating light corresponding to image information to a photosensitive medium, forms a visible toner image by supplying a toner to the electrostatic latent image, transfers the toner image onto the printing medium P, and fixes the toner image on the printing medium P by using heat and pressure. The printing medium P on which the printing operation is finished can be discharged to the discharging tray 13 provided on the upper surface 12 of the image forming part 1 through a discharge opening 14.

The scanner part 2 can read an image recorded on a document D. The scanner part 2 may have various structures such as a flatbed structure in which the document D is at a fixed position and a reading member reads the image while moving, a document feed structure in which a document is conveyed and the reading member reads an image from the document at a fixed position, a combination structure thereof, etc. The scanner part 2 according to the example has a combination structure. The scanner part 2 may include a document conveying device that conveys the document D placed on a document tray 23 through a reading member, to scan a document in the document feeding method and to scan a document in the flatbed method, a platen glass (not shown) on which the document D is placed is provided on a lower cover 21. An upper cover 22 may be connected to the lower cover 21 so as to pivot to a closed position where the platen glass is covered and to an opening position where the platen glass is exposed to place the document D on the platen glass.

The scanner part 2 can be located above the image forming part 1 to be spaced apart from the image forming part 1, As such, the space 5 can be generated between the scanner part 2 and the image forming part 1. The printing media P placed on the discharging tray 13 may be pulled out through the space 5. In some examples, when there is a paper jam during the discharging process, the paper jam may be addressed through the space 5. As a height of the space 5 is increased, a user may access the printing medium P and may address the paper jam.

In the image forming part 1 that prints the image on the printing medium P in the electrophotographic method, a fixing device can be disposed adjacent to the discharging opening 14. The fixing device can fix the toner image onto the printing medium P by heat and pressure. An operating temperature of the fixing device may be, for example, about 120° C. to about 200° C. The heat generated in the fixing device can be discharged to outside the image forming part 1. In some examples, the heat dissipated from the fixing device may be transferred to the scanner part 2 through the space 5. The printing medium P placed on the discharging tray 13 can be heated to a high temperature by the fixing device. In some instances, when an increased amount of printing operations is performed, an increased amount of printing media P at a higher temperature may be stacked on the discharging tray 13, and a distance between the printing media P and the scanner part 2 may be reduced. In response, the heat from the printing media P stacked on the discharging tray 13 may be also transferred to the scanner part 2, along with the heat from the fixing device. When a reading sensor is exposed to the heat of the higher temperature, performances of the reading sensor may degrade. In such an example, as the height of the space 5 is increased, a thermal influence to the scanner part 2 may be reduced and the scanner part 2 may operate more stably.

A total height of the image forming apparatus may dependent upon the height of the space 5. In this regard, according to the image forming apparatus of the example, the scanner part 2 may be moved up and down with respect to the image forming part 1 so as to increase the height of the space 5 as desired. For example, the scanner part 2 may be positioned in the bottom dead position (see FIG. 1) and may be lifted to the top dead position (see FIG. 2) in order to increase the height of the space 5. For example, when a lamer amount of printing operations is performed, the scanner part 2 may be positioned in the top dead position so as to access the printing media P stacked on the discharging tray 13 or to reduce the thermal influence to the scanner part 2. Also, when there is a paper jam while the printing medium P is discharged to the discharging tray 13, the scanner part 2 may be positioned in the top dead position to easily deal with the paper jam.

In some examples, the pair of side walls 3 and 4 is located between the image forming part 1 and the scanner part 2 to face each other and support the scanner part 2 with respect to the image forming part 1. The pair of side walls 3 and 4 may be extended/contracted when the scanner part 2 is moved up and down. The pair of side walls 3 and 4 can be spaced apart from each other in a width direction DW of the printing medium P. In some examples, the pair of side walls 3 and 4 can have lengths in a discharging direction DL of the printing medium P. As such, the scanner part 2 may be supported stably with respect to the image forming part 1.

In some examples, each of the pair of side walls 3 and 4 may include the fixed side wall 31 and the lifting side wall 32. The fixed side wall 31 can be supported on the upper surface 12 of the image forming part 1 and can extend upward. The lifting side wall 32 can extend downward from the lower surface of the scanner part 2 and can be supported by the fixed side wall 31 to be moved up and down. For example, when the scanner part 2 is in the bottom dead position, the lifting side wall 32 can be inserted into the fixed side wall 31, and when the scanner part 2 is in the top dead position, the lifting side wall 32 may protrude upward from the fixed side wall 31. According to the above configuration, the scanner part 2 may be supported by the pair of side walls 3 and 4 to be moved up and down to the bottom dead position and the top dead position.

In order to maintain the scanner part 2 in the bottom dead position and the top dead position, the scanner part 2 may be locked in the bottom dead position and the top dead position. The locking mechanism can lock the scanner part 2 in the bottom dead position and the top dead position.

The locking mechanism may be provided in at least one wall of the pair of side walls 3 and 4. As such, the scanner part 2 may be supported by the pair of side walls 3 and 4 in the top dead position and the bottom dead position.

Figure 3:
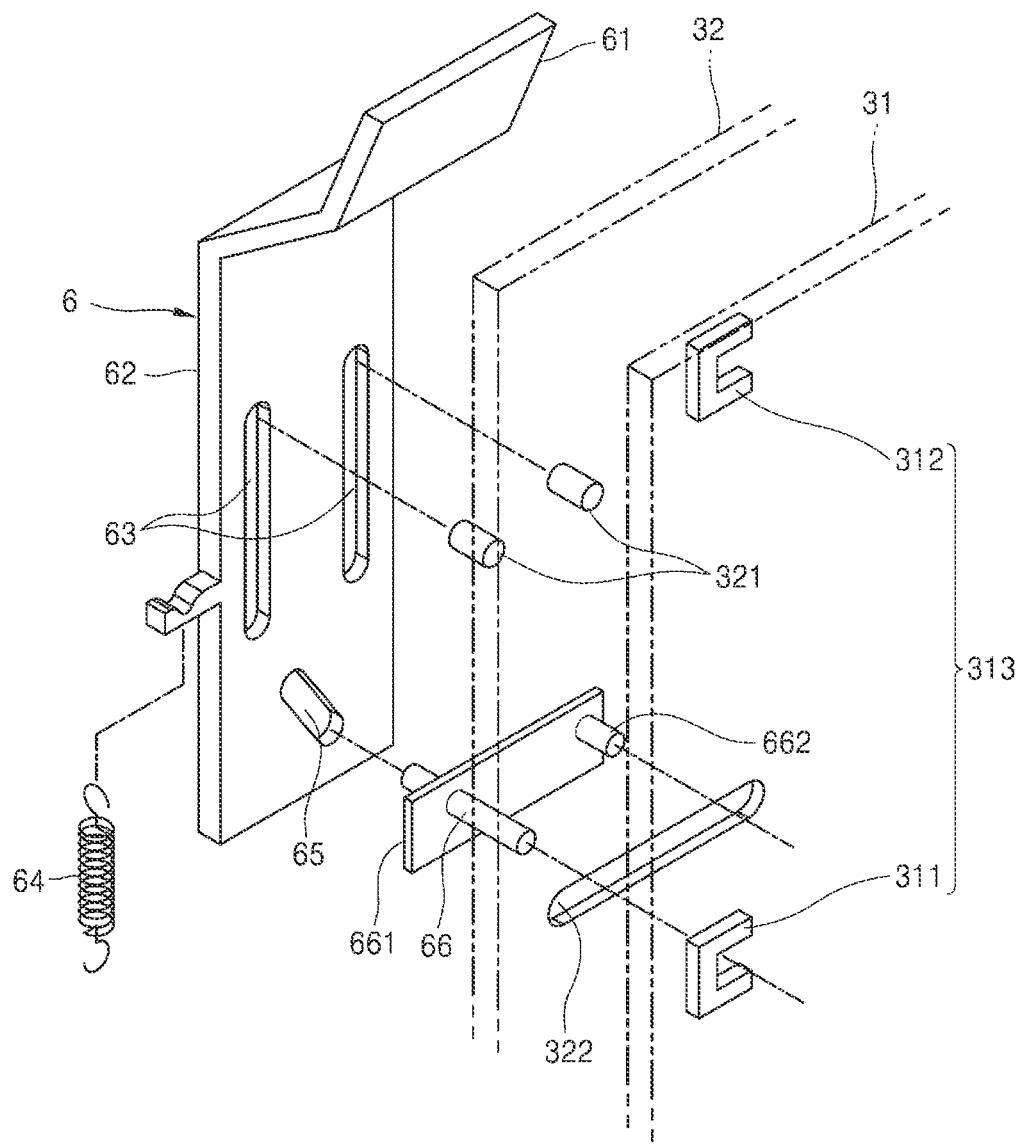
FIG. 3 is an exploded perspective view of a locking mechanism according to an example.
Figure 4:
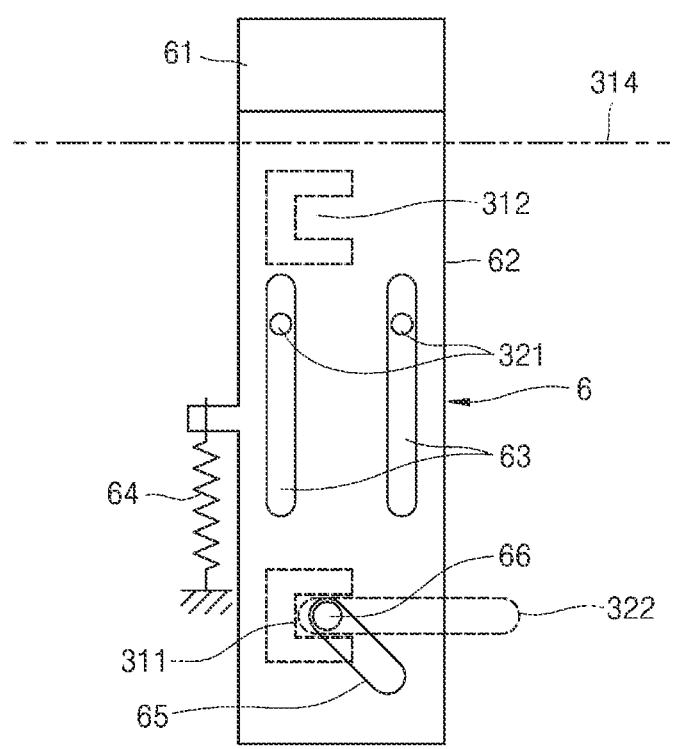
FIG. 4 is a plan view showing a state in which a scanner part is positioned in a bottom dead position and a locking lever is positioned in a locking position in the locking mechanism of FIG. 3 according to an example.
Figure 5:
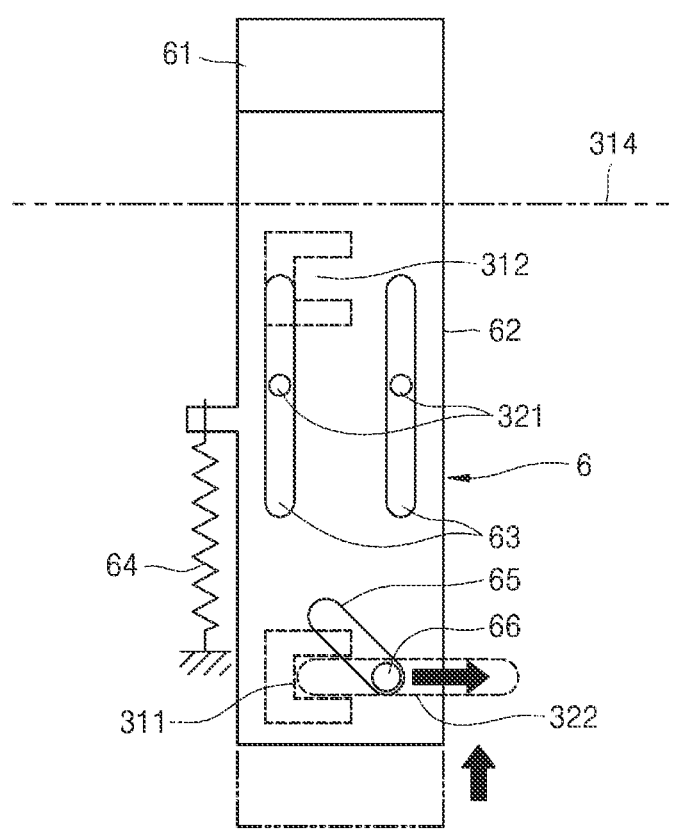
FIG. 5 is a plan view showing a state in which a scanner part is positioned in a bottom dead position and a locking lever is positioned in a release position in the locking mechanism of FIG. 3 according to an example.
Figure 6:
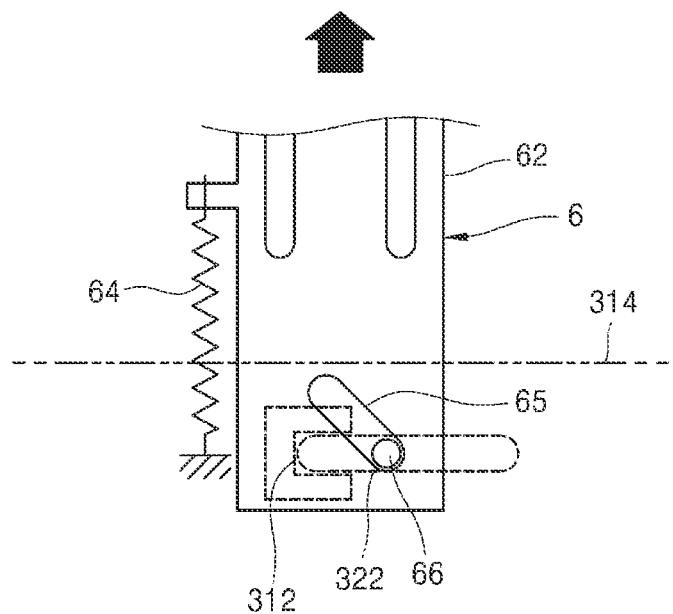
FIG. 6 is a plan view showing a state in which a scanner part is positioned in a top dead position and a locking lever is positioned in a release position in the locking mechanism of FIG. 3 according to an example.
Figure 7:
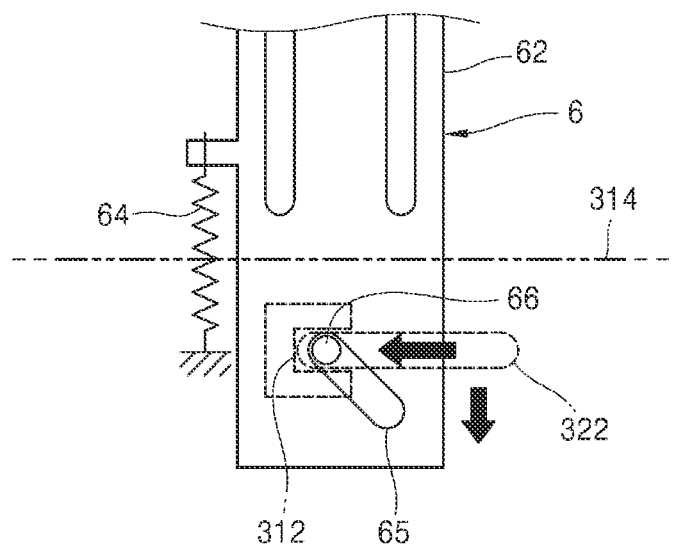
FIG. 7 is a plan view showing a state in which a scanner part is positioned in a top dead position and a lever is positioned in a locking position in the locking mechanism of FIG. 3 according to an example.

FIG. 3 is an exploded perspective view of a locking mechanism according to an example. FIG. 4 is a plan view showing a state in which the scanner part 2 is positioned in a bottom dead position and a locking lever 6 is positioned in a locking position in the locking mechanism of FIG. 3 according to an example. FIG. 5 is a plan view showing a state in which the scanner part 2 is positioned in a bottom dead position and the locking lever 6 is positioned in a release position in the locking mechanism of FIG. 3 according to an example. FIG. 6 is a plan view showing a state in which the scanner part 2 is positioned in the top dead position and the locking lever 6 is positioned in the release position in the locking mechanism of FIG. 3 according to an example. FIG. 7 is a plan view showing a state in which the scanner part 2 is positioned in the top dead position and the locking lever 6 is positioned in the locking position in the locking mechanism of FIG. 3 according to an example.

Referring to FIGS. 3 to 7, the locking mechanism may include a locker installed on the lifting side wall 32 to be switched between a locking position (FIGS. 4 and 7) at which the locker is engaged with a coupling tool 313 provided in the fixed side wall 31 in order to lock the lifting side wall 32 not to be moved up and down with respect to the fixed side wall 31, and a release position (FIGS. 5 and 6) at which the locker is disengaged from the coupling tool 313 so that the lifting side wall 32 may be moved up and down with respect to the fixed side wall 31, In FIGS. 4 to 7, reference numeral 314 denotes an upper edge of the fixed side wall 31.

The locker may include the locking lever 6 supported by the lifting side wall 32 to be moved up and down, and a locking protrusion 66 that is engaged with the coupling tool 313 or disengaged from the coupling tool 313 in accordance with the up and down movements of the locking lever 6.

In some examples, the locking lever 6 may include a grip portion 61 exposed to an outside of the lifting side wall 32 for the user to grip, and an extension 62 extending from the grip portion 61. In such an example, the grip portion 61 can be located adjacent to a lower portion of the scanner part 2 as shown in FIGS. 1 and 2. In such an example the user can grip the grip portion 61 and the scanner part 2 at the same time to move the scanner part 2 up and down.

The extension 62 may include guide rails 63 extending in an up-and-down direction. The lifting side wall 32 may include guide protrusions 321 that are inserted into the guide rails 63. According to the above configuration, the locking lever 6 may move up and down.

The extension 62 may include an operation slot 65 that is inclined with respect to the up-and-down direction. The locking protrusion 66 can be inserted into the operation slot 65. The operation slot 65 may be formed so as to disengage the locking protrusion 66 from the coupling tool 313 when the locking lever 6 is moved upward and to engage the locking protrusion 66 with the coupling tool 313 when the locking lever 6 is moved downward. In some examples, when the locking protrusion 66 is engaged with the coupling tool 313, the lifting side wall 32 may not be allowed to move up and down, and when the locking protrusion 66 is disengaged from the coupling tool 313, the lifting side wall 32 may be allowed to move up and down.

In an example, the locking protrusion 66 may be supported by a locking plate 661. The lifting side wall 32 may include a locking slot 322 that is cut in a direction in which the locking protrusion 66 moves. The locking protrusion 66 may pass through the locking slot 322 and extend towards the coupling tool 313. The locking plate 661 may include a guide protrusion 662 that is inserted into the locking slot 322. As such, when the locking lever 6 is moved up and down, the locking protrusion 66 may be stably moved along the locking slot 322.

In some examples, a spring 64 applies an elastic force to the locking lever 6 towards a direction in which the locker is positioned in the locking position. In such an example, the spring 64 applies the elastic force to the locking lever 6 in a descending direction.

The coupling tool 313 may have a shape that is open towards one side or opposite sides in the direction in which the locking protrusion 66 moves. The coupling tool 313 may include a first coupling tool 311 and a second coupling tool 312 that are respectively engaged with the locking protrusion 66 when the scanner part 2 is positioned in the bottom dead position and the top dead position. The second coupling tool 312 may be separated upward from the first coupling tool 311.

Operations of the locker having the above structure are described below.

Referring to FIG. 1, the scanner part 2 can be in the bottom dead position. As shown in FIG. 4, the locker can be in the locking position. The locking protrusion 66 can be engaged with the first coupling tool 311. In such an example, the lifting side wall 32 may not be moved up and down with respect to the fixed side wall 31, and the scanner part 2 may be locked in the bottom dead position.

In order to move the scanner part 2 to the top dead position, the locker can be switched to the release position. The locking lever 6 can be moved up by pulling the grip portion 61 of the locking lever 6. The operation slot 65 can push the locking protrusion 66. In response, the locking protrusion 66 may be disengaged from the first coupling tool 311 as shown in FIG. 5, and the lifting side wall 32 may be ready to move up and down with respect to the fixed side wall 31.

In this state, the scanner part 2 can be moved up to the top dead position as shown in FIG. 2. The locking lever 6 may still be in a pulled state, and as shown in FIG. 6, the locking protrusion 66 can be located parallel to the second coupling tool 312 in a state where the locking protrusion 66 is disengaged from the second coupling tool 312.

In order to lock the scanner part 2 in the top dead position, the locker can be switched to the locking position. For example, when the grip portion 61 of the locking lever 6 is released, the locking lever 6 can be descended by the elastic force of the spring 64. The locking protrusion 66 can be guided by the operation slot 65 that is descending and is engaged with the second coupling tool 312 as shown in FIG. 7. In some examples, the locker is switched to the locking position, and the lifting side wall 32 is not allowed to move up and down with respect to the fixed side wall 31. The scanner part 2 can be locked in the top dead position.

A process of moving the scanner part 2 from the top dead position to the bottom dead position can be the reverse of the process of moving the scanner part 2 from the bottom dead position to the top dead position. For example, when the locking lever 6 is moved upward from the state of FIG. 7, the locking protrusion 66 can be disengaged from the second coupling tool 312 as shown in FIG. 6. The scanner part 2 can be moved to the bottom dead position. In some examples, when the locking lever 6 is pulled after the scanner part 2 arrives at the bottom dead position, the locking protrusion 66 can be located parallel to the first coupling tool 311 in a state where the locking protrusion 66 can be disengaged from the first coupling tool 311, as shown in FIG. 5. When the grip portion 61 of the locking lever 6 is released, the locking lever 6 can be descended by the elastic force of the spring 64. The locking protrusion 66 can be guided by the operation slot 65 that is descending and can be engaged with the first coupling tool 311 as shown in FIG. 4. The lifting side wall 32 may not be allowed to move up and down with respect to the fixed side wall 31, and the scanner part 2 may be locked in the bottom dead position.

In order to move the image forming apparatus in a state in which the scanner part 2 is in the bottom dead position, the user may lift the image forming apparatus by holding the scanner part 2. When the locking lever 6 is pulled, the locking of the scanner part 2 can be released, and the scanner part 2 may be moved up to the top dead position from the bottom dead position. In order to move the image forming apparatus in a state in which the scanner part 2 is positioned in the top dead position, when the locking lever 6 is pulled while the image forming apparatus is lifted and laid down, the locking of the scanner part 2 can be released and the scanner part 2 may be descended to the bottom dead position. As described above, when the scanner part 2 is unintentionally moved from the bottom dead position to the top dead position or from the top dead position to the bottom dead position, the image forming apparatus may be damaged. In this regard, the locking mechanism may include a safety locking member 7 that is coupled to the fixed side wall 31 and the lifting side wall 32 by penetrating therethrough to fix the scanner part 2 in the bottom dead position and the top dead position when the scanner part 2 is positioned in the bottom dead position and the top dead position.

Figure 8:
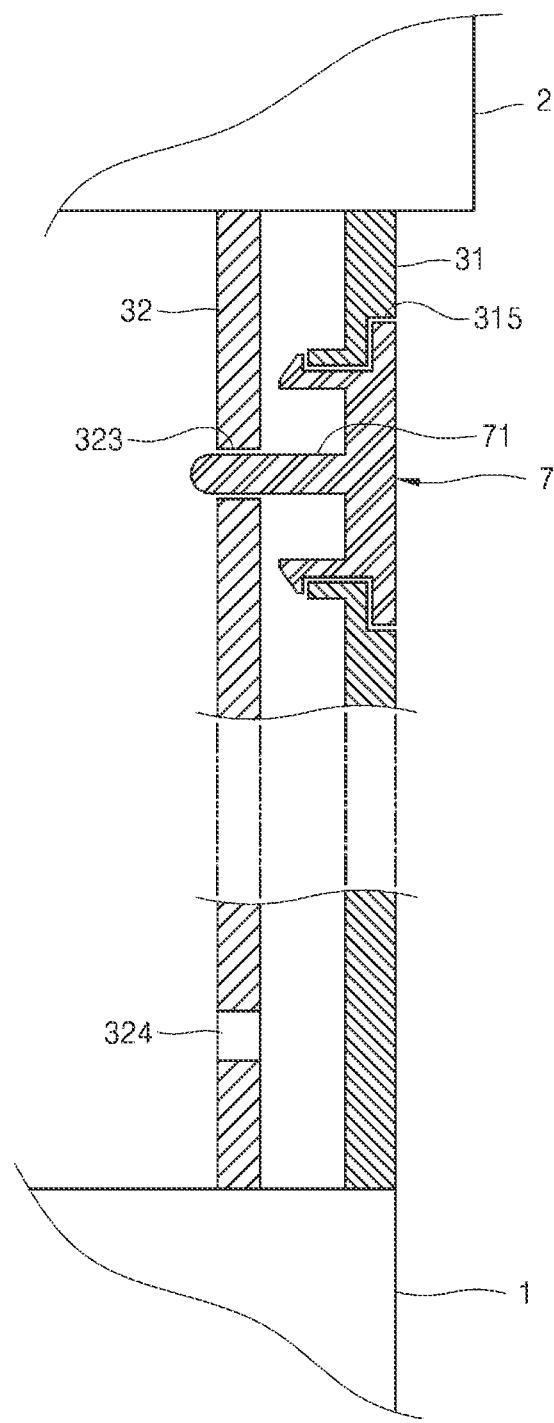
FIG. 8 is a cross-sectional view of a safety locking member according to an example.

FIG. 8 is a cross-sectional view of the safety locking member 7 according to an example. Referring to FIG. 8, the safety locking member 7 may include a body 71 fixed to the fixed side wall 31 and a safety protrusion 72 extending from the body 71. The fixed side wall 31 can include an accommodation portion 315 for accommodating the body 71, The safety locking member 7 may be fixed to the fixed side wall 31 in various ways. For example, the safety locking member 7 may be fixed to the fixed side wall 31 by a snap-fit method. The safety locking member 7 may be fixed to the fixed side wall 31 via a coupling unit such as a screw.

In some examples, the lifting side wall 32 includes safety recesses 323 and 324 in which the safety protrusion 72 can be inserted. The safety recesses 323 and 324 may be formed so that the safety protrusion 72 is inserted thereto respectively when the scanner part 2 is in the bottom dead position and the top dead position. For example, the safety recess 324 may be separated downward from the safety recess 323 by a distance between the bottom dead position and the top dead position of the scanner part 2. In some examples, when the scanner part 2 is positioned in the bottom dead position, the safety recess 323 can be aligned with the accommodation portion 315, and when the scanner part 2 is positioned in the top dead position, the safety recess 324 can be aligned with the accommodation portion 315, For example, when the safety locking member 7 is inserted into the accommodation portion 315 when the scanner part 2 is positioned in the bottom dead position and the top dead position, the safety protrusion 72 can be inserted respectively into the safety recess 323 and the safety recess 324 so that the lifting side wall 32 may not move up and down with respect to the fixed side wall 31. In such an example, the scanner part 2 may be fixed in the bottom dead position and the top dead position.

According to above configuration, the safety locking member 7 may be removed from the fixed side wall 31 in order to move the scanner part 2 up and down, and as a result, unintentional moving-up and moving-down of the scanner part 2 while handling the image forming apparatus may not occur. In some examples, the scanner part 2 may not be moved up and down due to shock applied to the image forming apparatus.

Figure 9:
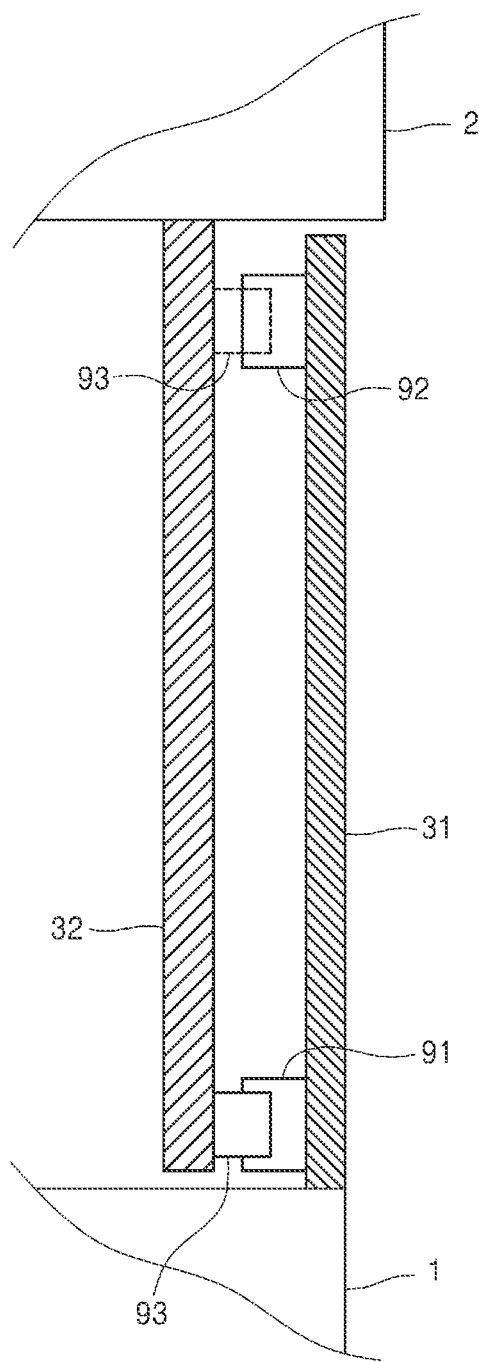
FIG. 9 is a schematic diagram of a sensor that senses whether a scanner has reached a top dead position and a bottom dead position, according to an example.

In some examples, the image forming apparatus may include a sensor for sensing a location of the scanner part 2. The sensor may sense whether the scanner part 2 reaches the top dead position and/or the bottom dead position. In the example, the sensor may sense whether the scanner part 2 reaches the top dead position and/or the bottom dead position by detecting a location of the lifting side wall 32. FIG. 9 is a schematic diagram of a sensor that senses whether the scanner part 2 reaches the top dead position and/or the bottom dead position, according to an example.

Referring to FIG. 9, a detection piece 93 can be provided on the lifting side wall 32. The sensor may include a first sensor 91 and a second sensor 92. The first sensor 91 and the second sensor 92 may be apart from each other in the up-and-down direction at a distance between the bottom dead position and the top dead position of the scanner part 2. In some examples, when the scanner part 2 is positioned in the bottom dead position, the detection piece 93 may be detected by the first sensor 91, and when the scanner part 2 is positioned in the top dead position, the detection piece 93 may be detected by the second sensor 92. Various types of sensors may be used as the first and second sensors 91 and 92. For example, the first and second sensors 91 and 92 may include optical sensors including a light-emitting portion and a light receiving portion. In some examples, when the detection piece 93 is located between the light-emitting portion and the light receiving portion, light emitted from the light-emitting portion may be blocked by the detection piece 93 and a light detection amount of the light receiving portion may be reduced. In some instances, the light receiving portion transmits to a controller (not shown) an electric signal corresponding to the light detection amount. The controller may determine whether the detection piece 93 is detected by the first sensor 91 and/or the second sensor 92 based on a magnitude of a voltage of the electric signal and may sense whether the scanner part 2 reaches the top dead position and/or the bottom dead position. The first and second sensors 91 and 92 may include micro-switches operated by the detection piece 93.

In some examples, the controller may generate a visual and/or audible warning when it is sensed that the scanner part 2 does not reach the top dead position or the bottom dead position based on the electric signal from the first and second sensors 91 and 92. For example, the controller may output a warning message for checking the location of the scanner part 2 via a display provided in a manipulation panel 100, output a warning sound through a buzzer, or output a signal for flicking a light-emitting lamp such as a light-emitting diode (LED). In some examples, the controller may terminate the operation of the image forming apparatus when it is sensed that the scanner part 2 does not reach the top dead position or the bottom dead position based on the electric signal from the first and second sensors 91 and 92.

Referring to FIG. 1 and FIG. 2, one wall of the pair of side walls 3 and 4 may include a door 8 opening/closing a part of the side wall 3 or 4 so as to access an internal space of the side walls 3 and 4. In the example, the door 8 is provided in the fixed side wall 31. In some examples, both walls of the pair of side walls 3 and 4 may include a door 8.

The door 8 may be used for various purposes. For example, the internal space of the side walls 3 and 4 may be used as a mounting space of an option kit. The option kit may include, for example, a local loop line control kit for allowing the image forming apparatus to function as a facsimile, a storage device such as a hard disk drive for allowing the image forming apparatus to function as a mail box, etc.

The option kit may be provided in a part of the space 5 that is expanded when the scanner part 2 is moved to the top dead position. For example, when the scanner part 2 is positioned in the top dead position, the scanner part 2 may be supported by the lifting side wall 32 that protrudes from the fixed side wall 31. In such an example, the door 8 may be open for the user to access the internal space of the side walls 3 and 4 for electrically connecting the controller of the image forming apparatus to the option kit.

Figure 10:
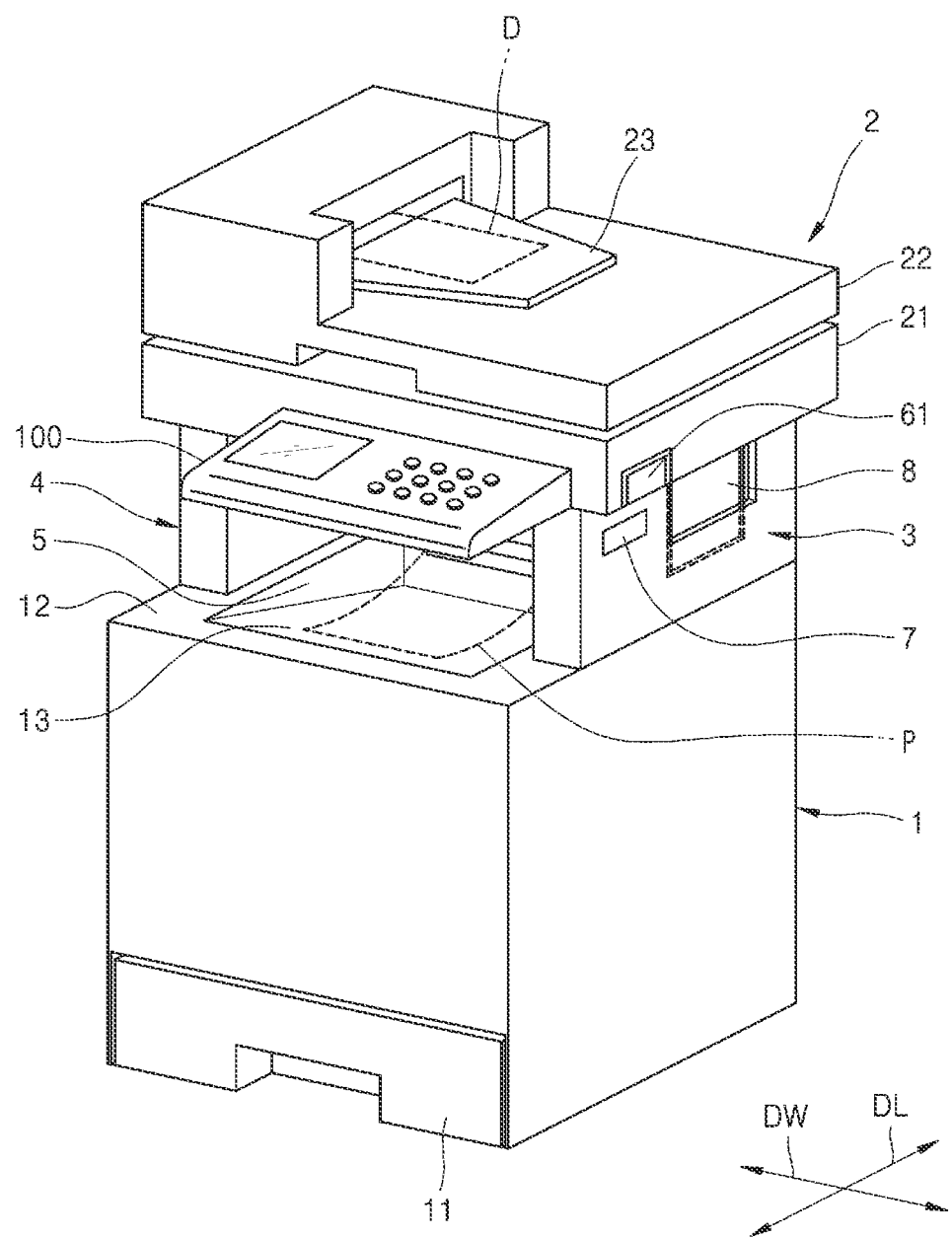
Figure 11:
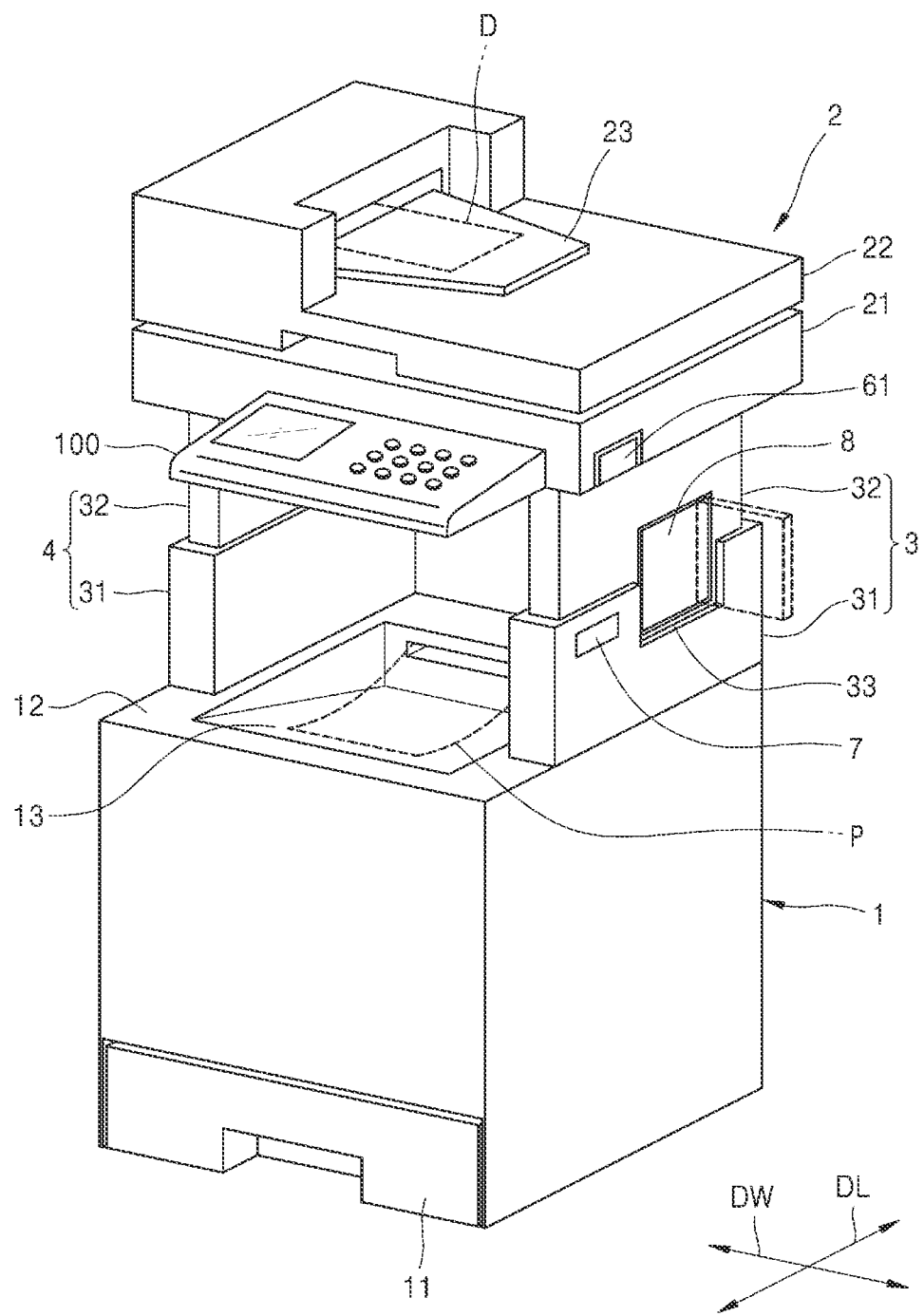

FIGS. 10 and 11 are perspective views of an image forming apparatus according to an example, wherein FIG. 10 shows a state in which the scanner part 2 is positioned in the bottom dead position and FIG. 11 shows a state in which the scanner part 2 is positioned in the top dead position. In the image forming apparatus according to the example, the door 8 is provided in the lifting side wall 32.

Referring to FIG. 10, when the scanner part 2 is positioned in the bottom dead position, the door 8 may be at least partially hidden by the fixed side wall 31. In such an example, when the scanner part 2 is positioned in the bottom dead position, the door 8 may not be open. When the scanner part 2 is positioned in the top dead position, the door 8 may not be hidden by the fixed side wall 31 as shown in FIG. 11, and as a result, the door 8 may be open.

According to the above configuration, when the option kit is mounted inside the lifting side wall 32, the option kit may not be accessed when the scanner part 2 is positioned in the bottom dead position. In such an example, when a security device such as a lock is installed on the safety locking member 7, the scanner part 2 may not be moved from the bottom dead position to the top dead position, and thus, unauthorized removal or unauthorized replacement of an optional device protected by security, for example, a storage device, etc., may be reduced (e.g., prevented). In such an example, an authorized user may unlock the security device of the safety locking member 7 and remove the safety locking member 7 to move the scanner part 2 to the top dead position. Subsequently, the user may open the door 8 to remove or replace the optional device protected by security (e.g., the storage device).

In some examples, a length of the door 8 in the up-and-down direction may be dependent upon a stroke of the scanner part 2 between the bottom dead position and the top dead position. The fixed side wall 31 may include a depressed portion 33 that is depressed downward from the upper edge of the fixed side wall 31. According to the above configuration, the height of the door 8 may be increased as compared with the case having no depressed portion 33.

In some examples, the image forming apparatus may include a lifting mechanism that supports the scanner part 2 to be moved up and down with respect to the image forming part 1. The lifting mechanism may be accommodated in the pair of side walls 3 and 4.

Figure 12:
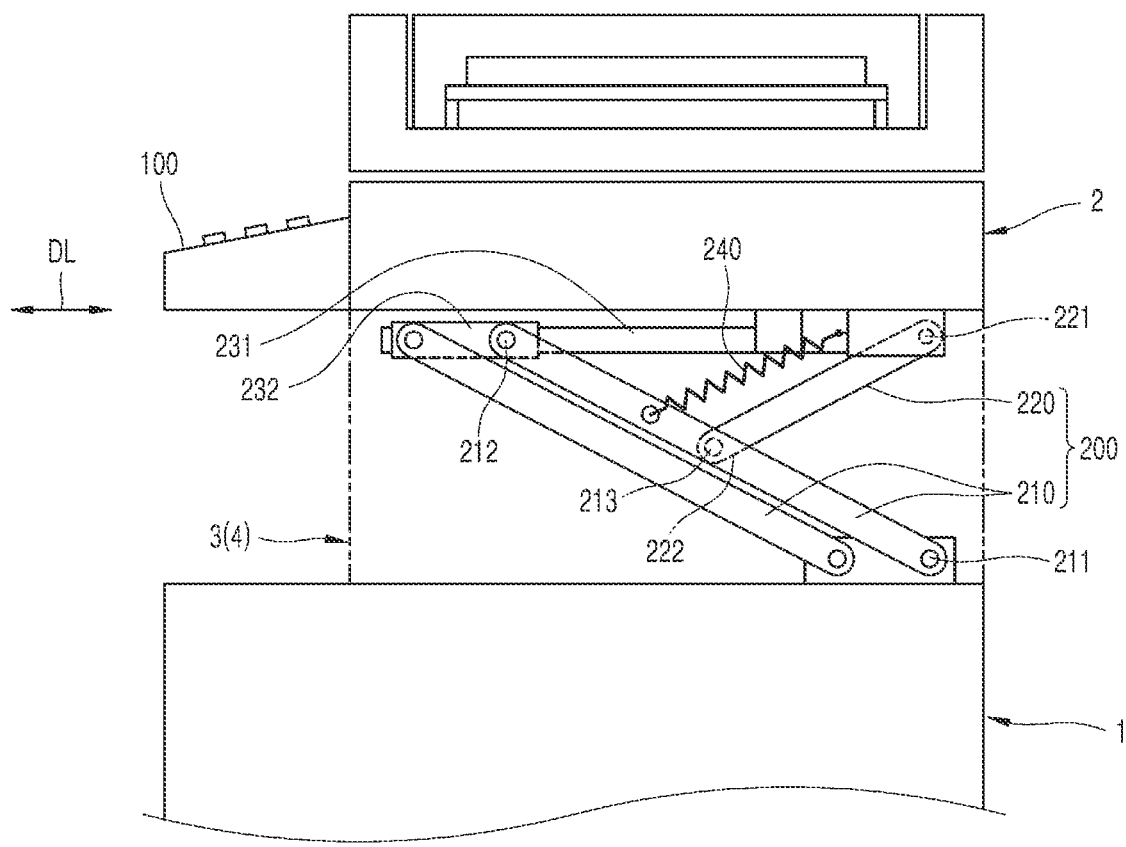
Figure 13:
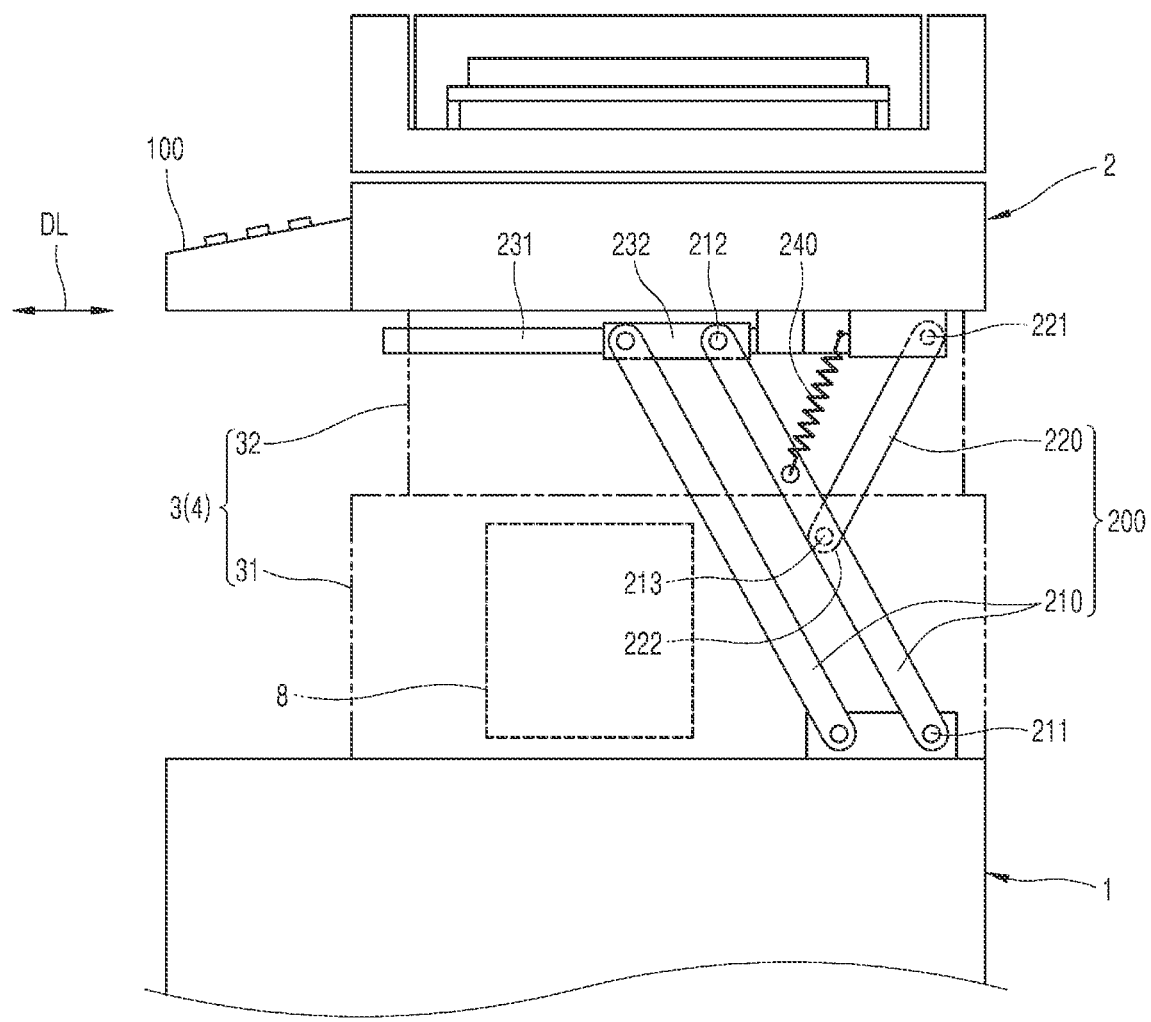

FIGS. 12 and 13 are schematic diagrams of a lifting mechanism according to an example, wherein FIG. 12 shows a state in which the scanner part 2 is positioned in the bottom dead position and FIG. 13 shows a state in which the scanner part 2 is positioned in the top dead position. Referring to FIGS. 12 and 13, the lifting mechanism according to the example may be implemented using a plurality of links intersecting one another in an X-shape.

In some examples, the lifting mechanism may include a first link 210 including a fixed end 211 that is pivotably connected to the image forming part 1 and a movable end 212 that is connected to the scanner part 2 to be sliding in the discharging direction DL of the printing medium P, and a second link 220 having one end 221 pivotably connected to the scanner part 2 and an opposite end 222 pivotably connected to a central portion 213 of the first link 210.

In such an example, one pair of first links 210 can be used in order to support the scanner part 2 with respect to the image forming part 1. The opposite end 222 of the second link 220 may be pivotably connected to the central portion 213 in one of the pair of first links 210. For example, the scanner part 2 may include a rail 231 extending in the discharging direction DL, and a slider 232 supported on the rail 231 to be sliding in the discharging direction DL. The movable ends 212 of the pair of first links 210 may be pivotably supported by the slider 232.

According to the above configuration, the scanner part 2 may move up and down to the top dead position and the bottom dead position.

In some examples, the image forming apparatus may include a bias member 240 that biases the scanner part 2 in an ascending direction in which the scanner part 2 is moved up to the top dead position. For example, the bias member 240 may be implemented by an elastic member connected to one of the first and second links 210 and 220 and the scanner part 2. In such an example, the bias member 240 can be implemented by a tension coil spring having one end and an opposite end that are respectively connected to the first links 210 and the scanner part 2. Although not shown in the drawings, the bias member 240 may be implemented by a gas suspension member connected to one of the first and second links 210 and 220 and the scanner part 2. For example, an end and an opposite end of the gas suspension member may be respectively connected to the first link 210 and the scanner part 2.

According to the above configuration, when the safety locking member 7 is removed from the accommodation portion 315 and the locking lever 6 is switched to the release position in a state in which the scanner part 2 is positioned in the bottom dead position, the scanner part 2 can be moved to the top dead position by the bias member 240. In such an example, the user may move the scanner part 2 up to the top dead position. In response to lifting and locating the scanner part 2 in the top dead position, the user may switch the locking lever 6 to the locking position and couple the safety locking member 7 to the accommodation portion 315 to lock the scanner part 2 in the top dead position. In some examples, even when the safety locking member 7 is removed from the side walls 3 and 4 and the locking lever 6 is switched to the release position in a state in which the scanner part 2 is positioned in the top dead position, the scanner part 2 may be supported by the bias member 240, and as a result, the scanner part 2 may not fall down to the bottom dead position. In response to pushing the scanner part 2 and locating the scanner part 2 in the bottom dead position, the user may switch the locking lever 6 to the locking position and couple the safety locking member 7 to the accommodation portion 315 in order to lock the scanner part 2 in the bottom dead position.

In some examples, the lifting mechanism including the first and second links 210 and 220, the rail 231, the slider 232, and the bias member 240 may be accommodated in the pair of side walls 3 and 4. The lifting mechanism may be provided to not hide the door 8 (e.g., exposes the door 8). For example, as shown in FIG. 13, the first links 210 and the second link 220 may be located so as not to hide the door 8 (e.g., exposes the door 8) when the scanner part 2 is positioned in the top dead position. As described above, since the lifting mechanism is provided so as not to hide the door 8 (e.g., exposes the door 8) when the scanner part 2 is positioned in the top dead position, the user may access the internal space of the side walls 3 and 4 after opening the door 8.

Figure 14:
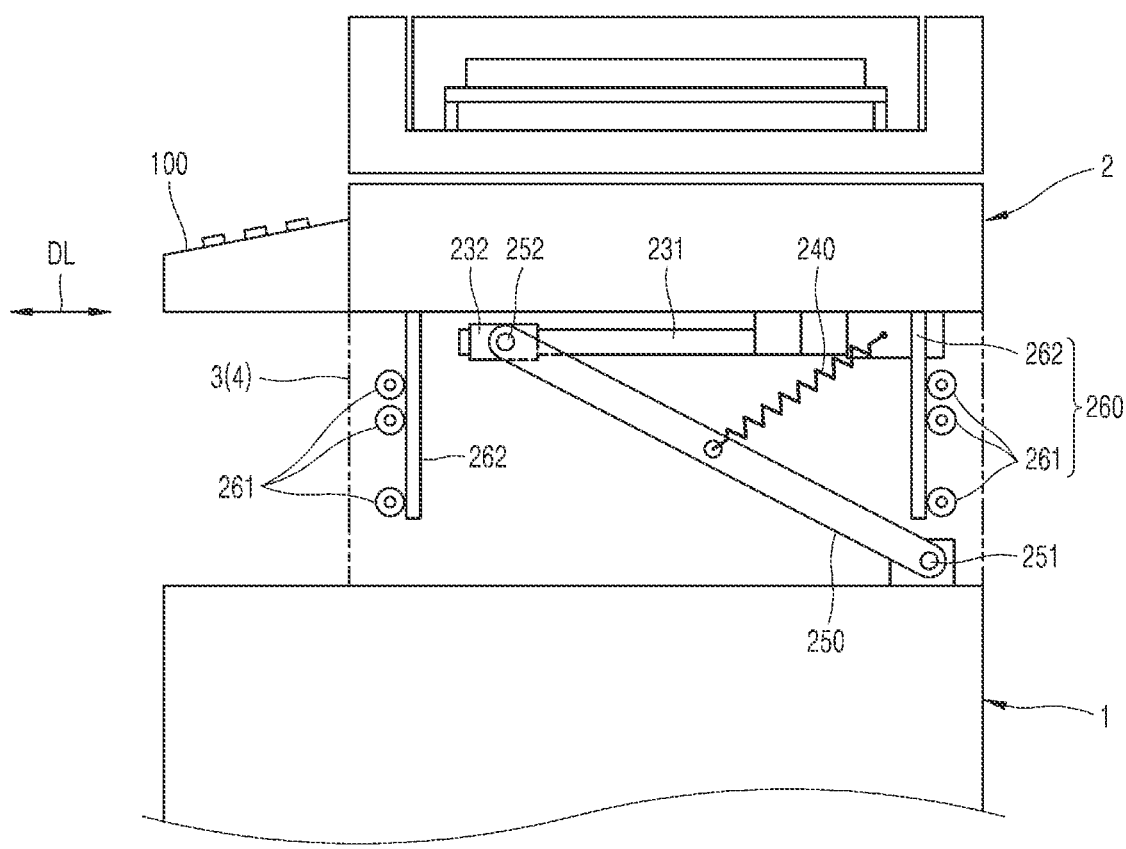
Figure 15:
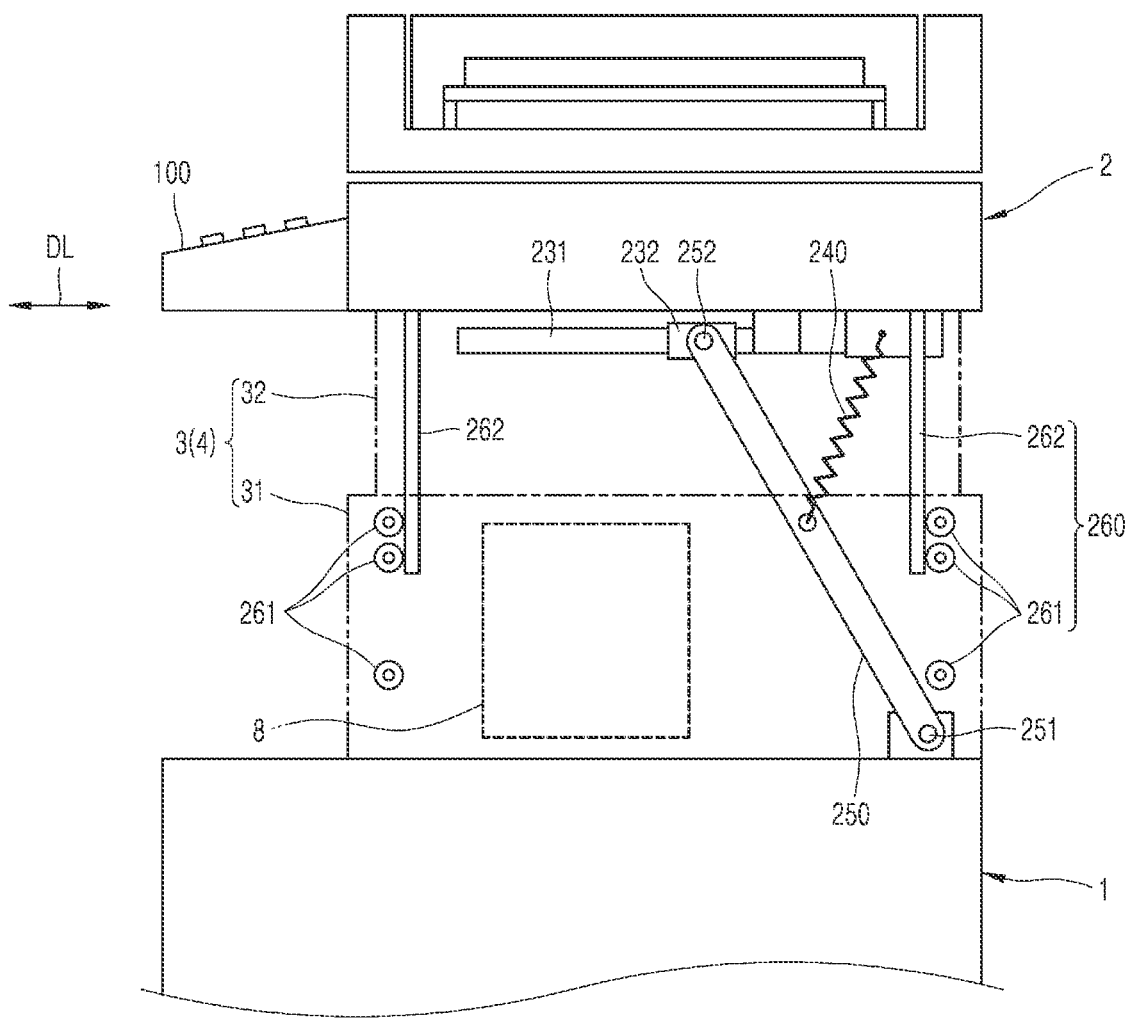

FIGS. 14 and 15 are schematic diagrams of a lifting mechanism according to an example, wherein FIG. 14 shows a state in which the scanner part 2 is positioned in the bottom dead position and FIG. 15 shows a state in which the scanner part 2 is positioned in the top dead position. Referring to FIGS. 14 and 15, the lifting mechanism according to the example may be different from the lifting mechanism shown in FIGS. 12 and 13, in that the lifting mechanism of the example is implemented by a link 250 and a sliding support portion 260 that supports the scanner part 2 to slide in up-and-down direction. Hereinafter, differences will be described below briefly.

The link 250 may include a fixed end 251 that is pivotably connected to the image forming part 1 and a movable end 252 that is connected to the scanner part 2 to be sliding in the discharging direction DL of the printing medium P. The scanner part 2 may include the rail 231 extending in the discharging direction DL, and the slider 232 supported on the rail 231 to slide in the discharging direction DL. The movable end 252 of the link 250 may be pivotably supported by the slider 232. The sliding support portion 260 may include a support member 262 extending downward from the scanner part 2 and a plurality of rotating rollers 261 that rotate in contact with the support member 262 and support the support member 262 to move up and down. The plurality of rotating rollers 261 may be provided on the image forming part 1. The number and locations of the plurality of rotating rollers 261 may be determined such that the support member 262 may be supported by two rotating rollers 261 when the scanner part 2 is positioned in the top dead position. In some examples, the support member 262 may be supported by more than two rotating rollers 261. The scanner part 2 may be biased by the bias member 240 in a direction in which the scanner part 2 is moved up to the top dead position.

According to the above configuration, the scanner part 2 may be moved up and down to the top dead position and the bottom dead position. The sliding support portion 260 shown in FIGS. 14 and 15 may be also applied to the lifting mechanism shown in FIGS. 12 and 13.

Figure 16:
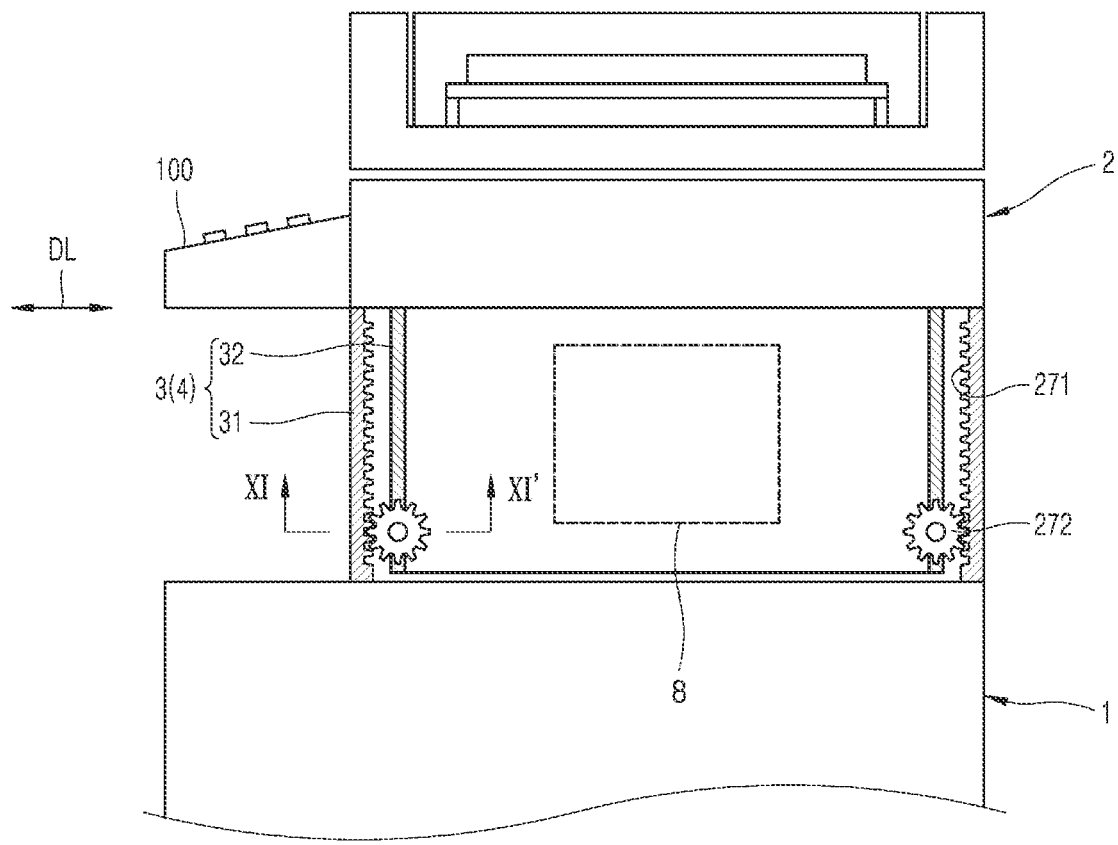
Figure 17:
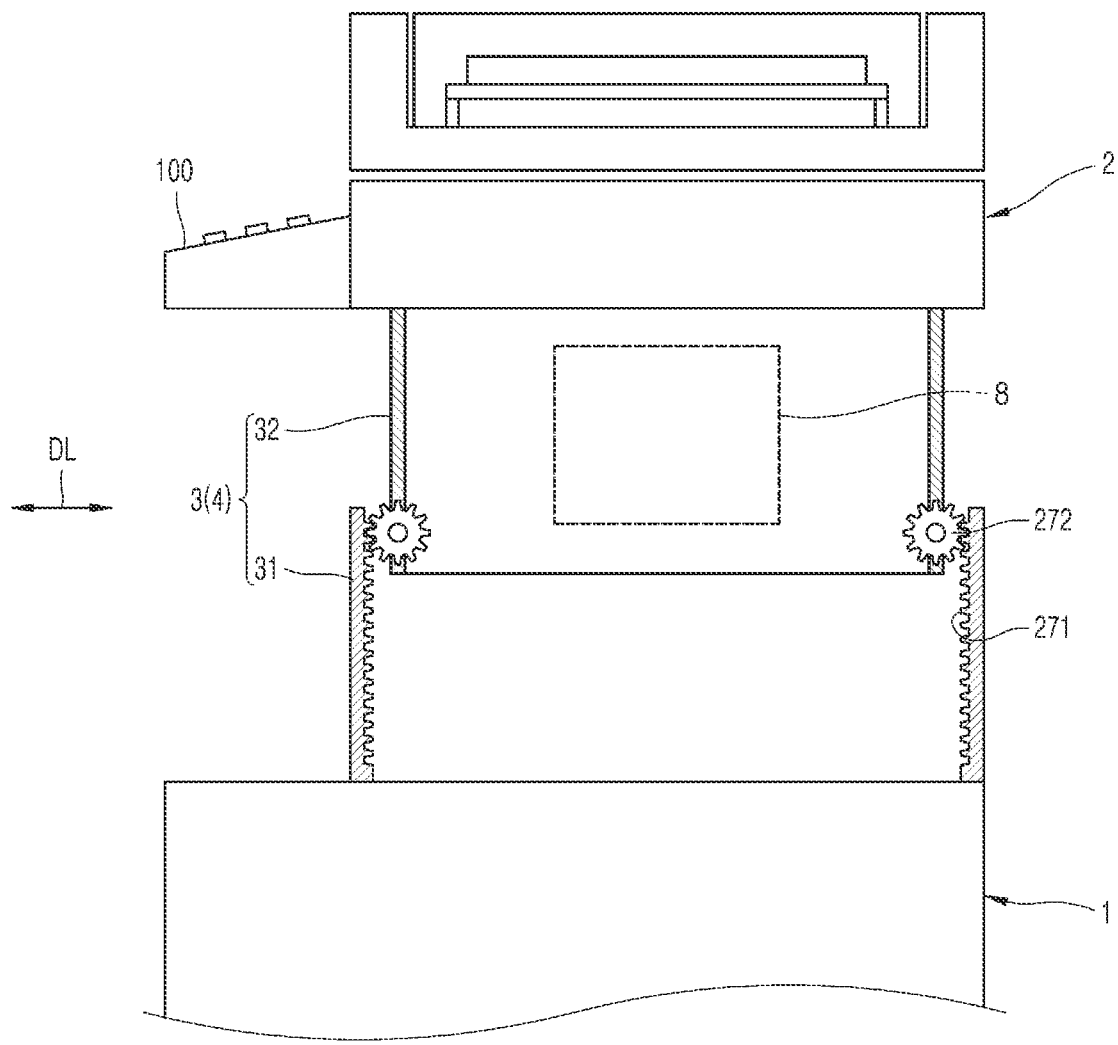

FIGS. 16 and 17 are schematic diagrams of a lifting mechanism according to an example, wherein FIG. 16 shows a state in which the scanner part 2 is positioned in the bottom dead position and FIG. 17 shows a state in which the scanner part 2 is positioned in the top dead position. Referring to FIGS. 16 and 17, the lifting mechanism according to the example is implemented by a rack-pinion mechanism. In some examples, the lifting mechanism includes a rack gear 271 provided on one of the fixed side wall 31 and the lifting side wall 32, and a pinion gear 272 provided on the other of the fixed side wall 31 and the lifting side wall 32 to be engaged with the rack gear 271.

In such an example, the rack gear 271 can be provided on the fixed side wall 31, and the pinion gear 272 can be provided on the lifting side wall 32. The rack gear 271 can extend in the up-and-down direction, for instance, moving-up and moving-down direction of the scanner part 2.

According to the above configuration, the scanner part 2 may be moved up and down to the top dead position and the bottom dead position. Also, since the lifting mechanism is provided at opposite edges of the side walls 3 and 4 based on the discharging direction DL, the door 8 may not interfere with the lifting mechanism when the door 8 is provided in any one of the fixed side wall 31 and the lifting side wall 32. The sliding support portion 260 shown in FIGS. 14 and 15 may be also applied to the lifting mechanism shown in FIGS. 16 and 17.

As shown in FIG. 16, in some examples when the scanner part 2 is positioned in the bottom dead position, the safety locking member 7 can be removed from the accommodation portion 315 and the locking lever 6 can be switched to the release position. In response, the scanner part 2 can be lifted and moved up to the top dead position. In response, the locking lever 6 can be switched to the locking position and the safety locking member 7 can be coupled to the accommodation portion 315 to lock the scanner part 2 in the top dead position. In some examples, as shown in FIG. 17, in a state in which the scanner part 2 is positioned in the top dead position, the safety locking member 7 can be separated from the side walls 3 and 4 and the locking lever 6 can be switched to the release position. In response, the scanner part 2 can be pulled down and positioned in the bottom dead position, the locking lever 6 can be switched to the locking position, and the safety locking member 7 can be coupled to the accommodation portion 315 to lock the scanner part 2 in the bottom dead position.

Figure 18:
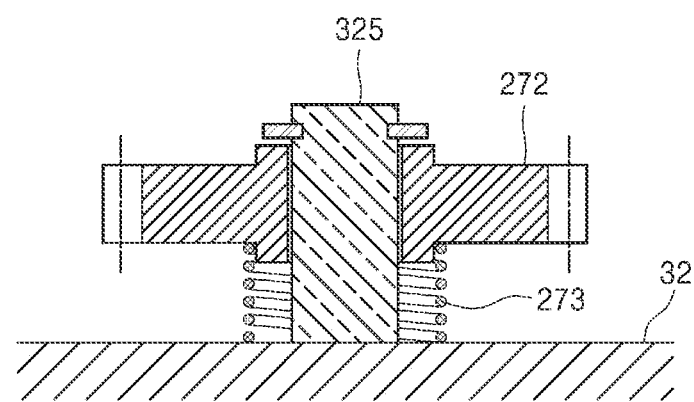
FIG. 18 is a cross-sectional view taken along line XI-XI' of FIG. 16.

FIG. 18 is a cross-sectional view taken along line XI-XI' of FIG. 16. Referring to FIG. 18, the pinion gear 272 may be inserted into a post 325 provided in the lifting side wall 32 and rotated. In some examples, the lifting mechanism may include a frictional member 273 applying a rolling friction force to the pinion gear 272 so as to prevent a sudden falling of the scanner part 2 to the bottom dead position when the safety locking member 7 is separated from the side walls 3 and 4 and the locking lever 6 is switched to the release position in a state in which the scanner part 2 is positioned in the top dead position. For example, the frictional member 273 may be implemented by a compression coil spring disposed between the lifting side wall 32 and the pinion gear 272. In some examples, the rolling friction force is applied to the pinion gear 272 due to the elastic force of the compression coil spring. As a result, even when the safety locking member 7 is separated from the side walls 3 and 4 and the locking lever 6 is switched to the release position in a state in which the scanner part 2 is positioned in the top dead position, the scanner part 2 may not suddenly fall down to the bottom dead position. Although not shown in the drawing, the frictional member 273 may be implemented by a plate spring, a friction pad, etc. provided between the lifting side wall 32 and the pinion gear 272.

It should be understood that examples described herein should be considered in a descriptive sense and not for purposes of limitation. Descriptions of features or aspects within each example should be considered as available for other similar features or aspects in other examples. While examples have been described with reference to the figures, it will be understood by those of ordinary skill in the art that various changes in form and details may be made therein without departing from the spirit and scope as defined by the following claims.

What is claimed is:

1. An image forming apparatus comprising:
   an image forming part to print an image on a printing medium, the image forming part comprising a discharging tray on which the printing medium on which a printing operation is completed is loaded and located on an upper surface of the image forming part;
   a scanner part to read an image from a document, the scanner part being located above the image forming part to form a space therebetween and to move up and down with respect to the image forming part;
   a pair of side walls facing each other and located between the image forming part and the scanner part, the pair of side walls comprising a fixed side wall supported on the image forming part and a lifting side wall to move up and down with respect to the fixed side wall and supported by the scanner part; and
   a door provided in the lifting side wall that is at least partially hidden by the fixed side wall when the scanner part is positioned in a bottom dead position,
      wherein the door is away from the fixed side wall to open and close when the scanner part is positioned in a top dead position.

2. The image forming apparatus of claim 1, wherein the pair of side walls are separated from each other in a width direction of the printing medium and have lengths in a discharging direction of the printing medium.

3. The image forming apparatus of claim 1, further comprising a locking mechanism provided in at least one of the pair of side walls to lock the scanner part in a bottom dead position and a top dead position,
   wherein the locking mechanism comprises a locker to switch to a locking position, at which the locker is engaged with a coupling tool provided at the fixed side wall to lock the lifting side wall such that the lifting side wall does not move up and down with respect to the fixed side wall, and a release position, at which the locker is disengaged from the coupling tool so that the lifting side wall is moved up and down with respect to the fixed side wall.

4. The image forming apparatus of claim 3, wherein the coupling tool comprises a first coupling tool and a second coupling tool that are engaged with the locker respectively when the scanner part is positioned in the bottom dead position and the top dead position.

5. The image forming apparatus of claim 3, wherein the locking mechanism comprises a safety locking member that is coupled to the fixed side wall and the lifting side wall by passing therethrough when the scanner part is positioned in the bottom dead position and the top dead position to fix the scanner part in the bottom dead position and the top dead position.

6. An image forming apparatus comprising:
an image forming part to print an image on a printing medium, the image forming part comprising a discharging tray on the printing medium on which a printing operation which is completed is loaded and located on an upper surface of the image forming part;
a scanner part to read an image from a document, the scanner part being located above the image forming part to form a space therebetween and to move up and down with respect to the image forming part; and
a pair of side walls facing each other and located between the image forming part and the scanner part, the pair of side walls comprising a fixed side wall supported on the image forming part and a lifting side wall to move up and down with respect to the fixed side wall and supported by the scanner part,
wherein the lifting side wall of the pair of side walls comprises a door that is at least partially hidden by the fixed side wall when the scanner part is positioned in a bottom dead position; and
the door is raised away from the fixed side wall to open and close when the scanner part is positioned in a top dead position.

7. The image forming apparatus of claim 6, further comprising a lifting mechanism to support the scanner part to be moved up and down with respect to the image forming part, wherein:
the lifting mechanism is accommodated inside the pair of side walls; and
the lifting mechanism exposes the door when the scanner part is positioned in the top dead position.

8. The image forming apparatus of claim 6, further comprising a sensor to sense whether the scanner part has reached the top dead position and the bottom dead position.

9. An image forming apparatus comprising:
an image forming part to print an image on a printing medium, the image forming part comprising a discharging tray on which the printing medium on which printing is completed is loaded and located on an upper surface of the image forming part;
a scanner part separated upward from the image forming part to form a space with the upper surface of the image forming part, the scanner part to read an image from a document;
a lifting mechanism to support the scanner part to move up and down with respect to the image forming part, wherein the lifting mechanism comprises:
a rack gear provided on one of a fixed side wall and a lifting side wall;
a pinion gear provided on the other of the fixed side wall and the lifting side wall and engaged with the rack gear; and
a frictional member to apply a rolling friction force to the pinion gear; and
a pair of side walls comprising the fixed side wall and the lifting side wall, to accommodate the lifting mechanism therein, and facing each other in a width direction of the printing medium to support the scanner part with respect to the image forming part, wherein the fixed side wall is supported by the image forming part and the lifting side wall is moved up and down with respect to the fixed side wall and is supported by the scanner part.

10. The image forming apparatus of claim 9, wherein the lifting mechanism comprises:
a first link comprising a first fixed end pivotably connected to the image forming part and a first movable end connected to the scanner part to be slidable in a discharging direction of the printing medium; and
a second link comprising an end pivotably connected to the scanner part and an opposite end pivotably connected to a central portion of the first link.

11. The image forming apparatus of claim 10, further comprising a bias member to bias the scanner part in a direction in which the scanner part is moved up into a top dead position.

12. The image forming apparatus of claim 10, further comprising:
a support member extending downward from the scanner part; and
a plurality of rotating rollers that rotate in contact with the support member and support the support member to move up and down.

* * * * *